May 1, 1951
J. R. AINSWORTH
2,550,900
FLUID PRESSURE BRAKE EQUIPMENT
Filed Aug. 19, 1949
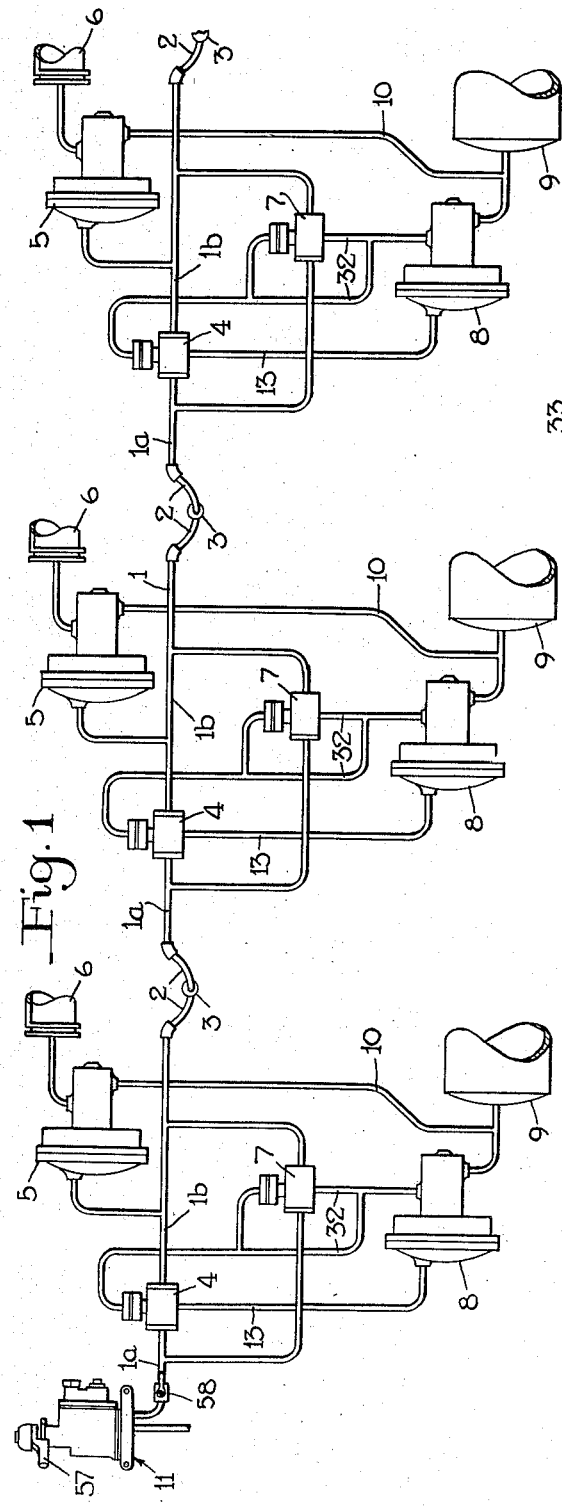
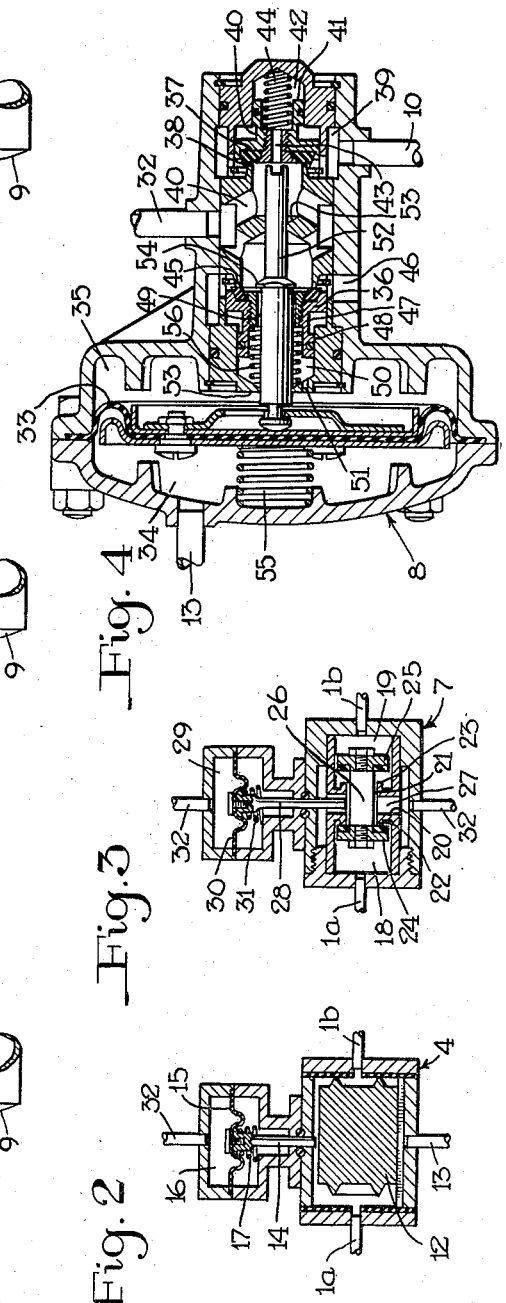
INVENTOR.
John R. Ainsworth
BY
Frank E. Miller,
ATTORNEY Patented May 1, 1951

2,550,900

UNITED STATES PATENT OFFICE 2,550,900

FLUID PRESSURE BRAKE EQUIPMENT

John R. Ainsworth, Delmont, Pa., assignor to The Westinghouse Air Brake Company, Wilmerding, Pa., a corporation of Pennsylvania Application August 19, 1949, Serial No. 111,159

8 Claims. (Cl. 303—48)

1

This invention relates to fluid pressure brake equipment for railway trains and more particularly to the straight air type.

A straight air brake equipment, as commonly known, comprises an operator's brake valve device for supplying and releasing, via a straight air pipe, fluid under pressure directly to and from a brake cylinder device for applying and releasing brakes. Such brake equipment is employed on individual vehicles or on short trains of, for example, two or three vehicles. It is impractical for use on longer trains however due to the time required for transmitting fluid under pressure through the straight air pipe between the brake valve device on the leading car of the train and the vehicle at the rear end of the train.

To control brakes on such longer trains on the usual straight air principle, so called electro-pneumatic straight air brake equipment has been employed in which electromagnets on each vehicle, controlled electrically from the brake valve device on the leading vehicle, are arranged to control substantially simultaneously the supply and release of fluid under pressure to and from the brake cylinder devices on all cars of the train.

For new light weight trains now being proposed, it is a requisite that the brake equipment be as light in weight as possible. Electro-pneumatic brake equipment such as above mentioned would adequately brake these new light weight trains but in view of the requirement for lightness in weight it is desirable not to use electromagnet structures on the vehicles without however any material sacrifice in the adequacy of brake control.

The principal object of the invention therefore is to provide a straight air brake equipment applicable to these new light weight trains which will provide approximately the same desirable control of brake application and release on all cars of the train as heretofore obtained with an electro-pneumatic straight air brake equipment.

According to this object I have provided a purely pneumatic straight air brake equipment for a vehicle having means which, in a train of such vehicles, is adapted to transmit serially from vehicle to vehicle throughout the length of the train, a straight air brake operation initiated by the brake valve device at the lead end of the train. In other words, if the brake valve device is operated to supply fluid under pressure to the straight air pipe on the lead vehicle of the train, means on said lead vehicle will respond to such supply to provide a like supply to the second vehicle of the train and so on serially throughout the train. The means on the several vehicles will operate serially in reverse manner to duplicate operation of the brake valve device to reduce the pressure of fluid in the straight air pipe. By such operations there will be so little difference between the time of applying the brakes on the first and last vehicles of the train, and of releasing such brakes, as to avoid rough train handling while at the same time providing for desired rapid stopping of the train. While it is intended that these trains normally operate only in one direction it may be necessary in certain yard operations that they be operated in the opposite direction by a locomotive connected thereto, and according to another feature of the invention the improved brake equipment is operable in the same manner from control initiated from either end of the train.

Other objects and advantages will become apparent from the following more detailed description of the invention.

In the accompanying drawing: Fig. 1 is an outline view of the improved brake equipment for a train of vehicles; and Figs. 2, 3 and 4 are sectional views of different devices shown in outline in Fig. 1.

Description

As shown in the drawing the reference numeral 1 designates a straight air train pipe adapted to extend through the train and to be coupled between the different vehicles of the train by the usual flexible hose 2 and hose couplings 3. The brake equipment for only three vehicles is shown in the drawing, but it is desired to point out that this is merely illustrative, since a train employing the improved equipment may be of any desired length.

The portion of the straight air train pipe 1 on each of the vehicles preferably comprises two sections designated in the drawing by numerals 1a and 1b which are separated from each other by a connecting double check valve device 4. The brake equipment for each vehicle may further comprise a relay valve device 5 arranged to operate in response to variations in pressure in either section, such as section 1b, of the straight air pipe 1 on the vehicle to provide like variations in pressure in a brake cylinder device 6 for controlling braking of the vehicle. The brake equipment for each of the vehicles may further comprise a double check valve device 7, a straight air control transmitting device 8 and a source of fluid under pressure, such as a reservoir 9 connected by a pipe 10 to the devices 5 and 6 and arranged to be supplied with fluid under pressure in any suitable manner.

In addition to the above, an operator's brake valve device 11 is also provided on the lead vehicle of the train, while the coupling 3 at the rear of the train may be closed by the conventional dummy coupling, not shown.

The double check valve device 4 on each vehicle comprises (Fig. 2) a casing containing a double check valve 12 slidable therein and open at opposite ends to pipes 1a and 1b and at one side to a pipe 13. In the position in which the double check valve 12 is shown in the drawing it opens pipe 1a to pipe 13 and closes communication between pipe 13 and pipe 1b. In an opposite position the double check valve is adapted to close communication between pipes 13 and 1a and open pipe 13 to pipe 1b. A plunger 14 is slidably mounted in the casing for contact with one side of the double check valve 12 to lock it against movement. Connected to the plunger 14 is a flexible diaphragm 15 adapted to be operated by fluid under pressure in a chamber 16 to move plunger 14 into such locking engagement. Upon venting of fluid under pressure from chamber 16 a spring 17 is adapted to withdraw plunger 14 from locking engagement with the double check valve 12. Chamber 16 is open to a pipe 32.

The double check valve device 7 on each vehicle may comprise (Fig. 3) a casing having two chambers 18 and 19 open respectively to pipes 1a and 1b and separated by a partition wall 20 having a through bore 21 open at opposite ends through annular seat ribs 22 and 23 extending into chambers 18 and 19 respectively. Check valves 24 and 25 contained in chambers 18, 19 for seating engagement with seats 22, 23, respectively, are connected for movement in unison by a stem 26 extending through the bore 21, the length of said stem being such as to open either one of said check valves when the other is seated. The bore 21 is open through one or more ports 27 to pipe 32. Slidably mounted in the casing and extending through one of the bores 27 is a locking plunger 28 arranged to be operated into locking engagement with stem 26 by pressure of fluid in a chamber 29 acting on a diaphragm 30. When chamber 29 is void of fluid under pressure a spring 31 is adapted to remove the stem 28 from locking engagement with stem 26. Chamber 29 is open to pipe 32.

The straight air control transmitting device 8 may, for the purpose of illustration, comprise a casing containing a flexible diaphragm 33 at one side of which is a control chamber 34 open to pipe 13 while at the opposite side is a chamber 35. Also at the opposite side of diaphragm 33 are two spaced apart poppet valves 36 and 37, constituting fluid pressure release and fluid pressure supply valves, arranged in coaxial relation to said diaphragm for control thereby.

The valve 37 is arranged to seat in the direction of diaphragm 33 against an annular seat rib 38 for closing communication between a fluid pressure supply chamber 39 open to the seating side of said valve and to pipe 10, and a chamber 40 open to pipe 32. The valve 37 is slidably mounted in a bore in the casing and at the side opposite the seat rib 38 is connected by a stem 40 to a piston 41 slidably mounted in a bore in the casing which latter bore, and thereby piston 41, is of substantially the same diameter as seat 38. At the opposite side of piston 41 is a chamber 42 open to chamber 40 through a bore 43 and containing a spring 44 acting on piston 41 for urging valve 37 into engagement with its seat 38. Since the piston 41 is of substantially the same diameter as the seat 38 it will be seen that the opposing forces incident to pressure of fluid acting on opposite sides of the valve 37 and piston 41 are substantially the same so that spring 44 need only exert relatively light pressure on said piston to seat said valve and a correspondingly light pressure is required on said valve to unseat it against said spring.

The valve 36 is arranged to seat in the direction of valve 37 against an annular seat rib 45 for closing communication between chamber 40 and an atmospheric passage 46. The valve 36 is slidably mounted in a bore in the casing and connected by a stem 47 to a piston 48 also slidably mounted in the casing. Chamber 40 is open through a bore 49 to a chamber 50 at the opposite side of piston 48 and the diameter of said piston is substantially the same as the inside diameter of the valve seat 45 to provide a valve structure which is substantially balanced with respect to forces incident to pressures of fluid in chambers 40, 50 and acting on adjacent faces of said piston and valve 36. A light bias spring 55 in chamber 50 acts on valve 36 for urging it into contact with seat 45. Chamber 50 is open through a small port 51 to chamber 35 at the adjacent side of diaphragm 31.

A stem 52 slidably mounted in the casing in two spaced bearing 53 and extending through chambers 40 and 50 and with annular clearance through bore 49 is connected at one end to the diaphragm 33 for movement therewith. The opposite end of stem 52 is arranged for engagement with the seating face of valve 37 within the seat rib 38. A shoulder 4 is provided on stem 52 within chamber 40 to engage and unseat the valve 36 by movement of stem 52 in the direction of the left hand. A bias spring 55 in chamber 34 acts on diaphragm 33 to hold it against stem 52.

Operation of the straight air control transmitting device 8 is as follows:

Let it be assumed that initially both valves 36 and 37 are seated and that diaphragm 33 is in a neutral position in which position these parts are shown in the drawing. Let it further be assumed that the reservoir 9 is charged with fluid under pressure and hence the supply valve chamber 39 correspondingly charged.

Now let it be assumed that fluid is supplied to chamber 34 at a pressure sufficient to deflect diaphragm 33 against pressure in chamber 35. The diaphragm 33 will then deflect in the direction of the right hand moving the stem 52 through and hence relative to the seated release valve 39 into contact with the supply valve 37 and when sufficient further increase in pressure of fluid is then obtained in chamber 34 to overcome spring 44, said diaphragm through the medium of stem 52 will open said supply valve. Fluid under pressure from the reservoir 9 and chamber 39 will then flow past the open supply valve 37 to chamber 40 and thence to pipe 32. At the same time as fluid is thus supplied to pipe 13, fluid will also flow from chamber 40 through bore 49 in the release valve 36 to chamber 50 to maintain a balance of fluid pressures in said chambers acting oppossingly on said valve and piston 48 so that spring 56 may hold said valve seated. Fluid under pressure from chamber 50 will also flow through port 51 to chamber 35 whereby the pressure of fluid in the latter chamber will increase substantially with the increase in pressure in pipe 13.

Now assume that the increase in pressure of fluid in chamber 34 is limited to some chosen degree. When the pressure of fluid in pipe 32 and chamber 35 is built up to substantially the degree acting in chamber 34 the spring 44 will move the supply valve 37 back into contact with its seat 38 and at the same time return the diaphragm 33 to its neutral position, thereby limiting the pressure of fluid obtained in pipe 32 to substantially the same degree as provided in chamber 34.

It will be apparent from the above description that for any increase in pressure of fluid in chamber 34 the device 8 will operate to effect a like increase in pressure of fluid in pipe 32.

Now assuming that the valve device 8 is in a neutral or lap position with both valves 36 and 37 closed, as shown in the drawing, and with any chosen pressure of fluid in chambers 34, 35 and in pipe 13, and the pressure of fluid in chamber 34 is reduced to a chosen lower degree. In response to such reduction the diaphragm 33 will be deflected by the higher pressure of fluid in chamber 35 in the direction of the left hand and thereby through the stem 52 draw the shoulder 54 against and then pull the release valve 36 out of contact with its seat 45 whereupon fluid under pressure will be released from pipe 32, chambers 49 and 50 and through the medium of port 51 from chamber 35. When the pressure of fluid in chamber 35 then becomes reduced to substantially the same degree as that still effective in chamber 34 spring 55 will deflect diaphragm 33 toward the right hand to permit closing of the release valve 36 by spring 56 to thereby limit the reduction in pressure in pipe 32 to substantially the same degree as the reduction in chamber 34. It will now be apparent that for any reduction in pressure of fluid in chamber 34 a corresponding reduction in pressure of fluid will occur in pipe 32. If the pressure of fluid in chamber 34 is reduced to atmospheric pressure the pressure in chamber 35 and hence in pipe 32 will reduce to substantially the same pressure before the force of spring 55 on diaphragm 33 and of spring 56 on valve 36 will predominate, whereupon the valve 36 will be closed. For all practical purposes the pressure of fluid in pipe 32 will be atmospheric pressure upon such closing of valve 36.

It will now be seen that the valve device 8 will respond to any pressure of fluid provided in pipe 13, and any increase or decrease in such pressure to provide a substantially like pressure in pipe 32.

The relay valve device 5 may, for illustration, be like the straight air control device 8 for varying pressure of fluid in the brake cylinder device 6 in accordance with variations in control pressure in pipe 1b.

The operator's control valve device 11 may be of any suitable structure, as for example like that disclosed in U. S. Patent 2,042,112, issued on May 29, 1936 to E. K. Lynn et al. and will therefore be only briefly described particularly since devices of this general type are so well known.

The brake valve device 11 comprises an operator's control handle 57 and valve means (not shown) adjustable by said handle upon movement out of a normal position, in which it is shown in the drawing, toward the right hand, or upon return movement toward the left hand, to provide in the connected pipe 1a fluid at a pressure proportional to the distance said handle is out of the normal position. In the normal position of handle 57 the connected pipe 1a may be open to atmosphere.

*Operation of equipment*

Let it be assumed that several vehicles provided with the improved brake equipment are connected in a train, as shown in the drawing, that the reservoirs 9 are charged with fluid under pressure and that the handle 57 of the brake valve device 11 on the leading vehicle is in its normal position opening the connected pipe 1a to atmosphere. With pipe 1a on the leading vehicle open to atmosphere, pipe 1b on said vehicle and pipes 1a and 1b on all of the other vehicles will likewise be at atmospheric pressure, the relay valve devices 8 on the several vehicles will be in their brake release position, in which the parts are shown in Fig. 4 of the drawing, and the relay valve devices 5 will likewise be positioned with the brake cylinder devices 6 vented to atmosphere, as will become apparent from the description to follow:

With the brakes on the train thus released, if the operator desires to apply the brakes he will move the brake valve handle 57 from its normal position in the direction of the right hand to a position corresponding to the degree of brake application desired, and thereby supply fluid at a corresponding pressure to the connected pipe 1a. The fluid under pressure thus supplied to pipe 1a on the leading vehicle will flow into chamber 18 of the respective double check valve device 7 wherein such pressure acting on check valve 24 will seat same and open the check valve 25, in case these valves are not already so positioned. At the same time, fluid from pipe 1a connected to the brake valve device will flow to and act on the left hand end of the double check valve 12 in the device 4 on the leading vehicle and move said valve to its right hand position, if not already so positioned, and then flow past the left hand end of said valve and through pipe 13 to diaphragm chamber 34 in the straight air control transmitting device 8 on the leading vehicle and actuate said transmitting device to supply past the open valve 25 in the double check valve device 7 fluid at a corresponding pressure to pipe 1b on the leading vehicle.

Fluid under pressure thus supplied to pipe 1b on the leading vehicle will flow to pipe 1a on the second vehicle in the train and, as on the leading vehicle, position the double check valve devices 4 and 7 and operate the transmitting device 8 thereon to supply to pipe 1b on said second vehicle fluid at substantially the same pressure as provided in pipe 1a on the leading vehicle, and this action will be thus transmitted serially from one vehicle to another to the rear of the train at which position the pressure of fluid obtained in pipe 1b will also be substantially equal to that provided in pipe 1a on the leading vehicle.

It is to be noted that the brake valve device 11 supplies fluid under pressure to operate only the transmitting device 8 on the leading vehicle of the train and said transmitting device operates to supply from a local source fluid to operate only the relay valve device 5 on that vehicle and the transmitting valve device 8 on the next car to the rear, and so on through the train. With the transmitting devices 8 very sensitive to pressure changes in chamber 34 to reproduce only in the connected sections 1b and 1a of the straight air pipe on the respective vehicle and the connected vehicle to the rear a rapid increase in pressure in the train straight air pipe 1 may be obtained, and in response to such increase the relay valve devices 5 will serially operate to supply fluid at a corresponding pressure to the brake cylinder devices 6 for applying the train brakes.

If only a partial degree of brake application is effected, the degree may be increased by moving the brake valve handle 57 further toward the right hand for effecting an increase in pressure of fluid in the connected pipe 1a. In response to such increase the transmitting device 8 on the leading vehicle and then on the next vehicle, and thus serially through the train, will operate to effect a corresponding increase in pressure in the connected straight air pipes sections 1b, 1a to the rear and the relay valves 5 will operate serially to provide a corresponding increase in pressure in the brake cylinder device 6 and thereby a corresponding increase in the degree of brake application on the train, in the same manner as above described.

It will thus be seen that a brake application may be limited to any desired degree and increased in degree if desired, in any desired steps.

When an application of brakes is effected on a train, as just described, fluid under pressure supplied to pipe 32 on each vehicle will flow to diaphragm chambers 16 and 29 in the double check valve devices 4 and 7 and operate the diaphragms 15, 30 to move the locking stems 14, 28 into locking engagement with the double check valve 12 and stem 26 of the double checking valve device 7 for holding the parts of said devices in the position to which they were moved, for reasons which will be presently brought out.

In order to release an application of brakes on the train, the brake valve handle 57 will be moved back toward its normal position. If less than a full release of brakes is desired the handle will be stopped short of its normal position according to the degree of brake application which it is desired to retain, while in case a full release is desired the handle will be moved to said position.

Let it be assumed that the hande 57 is stopped short of normal position in which case the pressure of fluid in the connected pipe 1a will be merely reduced to a corresponding degree, and a like reduction in pressure will occur on the left hand end of the double check valve 12 and in chamber 18 of the double check valve device 7 on the leading vehicle, but due to the locking action of stems 14 and 28 said check valve and the parts of the check valve device 7 will remain in the position to which they were moved in effecting an application of brakes against the opposing higher pressure of fluid in the connected pipe 1b. Thus as the pressure of fluid in pipe 1a on the leading vehicle is reduced, a like reduction in pressure will occur in diaphragm chamber 34 of the transmitting device 8 on said vehicle and said transmitting device will operate to effect a corresponding reduction in pressure in the connected pipe 1b. Such reduction in pressure in pipe 1b on the leading vehicle will be transmitted to the transmitting device 8 on the second vehicle of the train which will operate to effect a like reduction in pressure in pipe 1b on said second vehicle, and so on serially through the train, the pressure of fluid in the straight air pipe being thus reduced to substantially the same degree as in pipe 1a on the leading vehicle. In response to such reduction in pressure in pipe 1b on the several vehicles the relay valve devices 5 will serially operate to effect a like reduction in pressure in the brake cylinder devices 6 and hence a corresponding reduction in the degree of brake application on the vehicles of the train.

If the brake valve handle 57 is moved further toward its normal position the brakes on the vehicles of the train will be serially released accordingly while upon movement to said normal position for completely venting the connected pipe 1a, the transmitting devices 8 will operate as above described to reduce the pressure of fluid in the connected pipes 1b to substantially the same pressure whereby the relay valve devices 5 will operate accordingly to effect a substantially full release of fluid under pressure from the brake cylinder devices 6 and thereby a complete release of brakes. The locking pins 14 and 28 will remain effective until the pressure in the connected pipes 32 is reduced to the degree to provide a full release of brakes.

It will now be seen that an application of brakes on the train may be released in steps or a continuous complete release may be effected as desired.

It will also be apparent from the above description that by appropriate manipulation of the brake valve handle 57 the brakes on the train may be applied to any desired degree, partially released and then reapplied as desired for adequate control of the train under different circumstances.

It will be noted that the brake valve device 11 controls the fluid pressure only in chamber 34 of the transmitting device 8 on the leading vehicle and that said transmitting device on the leading vehicle, and the transmitting device on each of the following vehicles, controls the fluid pressure for controlling operation of the relay valve devices 5 on the respective vehicles and also of the transmitting device on the next vehicle to the rear, the double check valve devices 4 and 7 closing communication between the straight air pipe sections 1a and 1b on each vehicle to provide such control.

If the train brakes were to be controlled only from the brake valve device 57 at the one end of the train, the double check valves 4 and 7 could be dispensed with and the pipes 1a and 1b on each vehicle connected directly to chambers 34 and 40 of the respective transmitting device. However the double check valves 4 and 7 are essential to provide for control of the train brakes from the end of the train opposite the brake valve device 11 as during switching or yard operations by the brake valve device (not shown) on a yard locomotive.

If a yard locomotive is connected to the end of the train opposite the brake valve device 11 and the brake valve device on said locomotive connected to the straight air pipe 1, operation of the latter brake valve device to supply fluid under pressure to the connected portion 1b of the straight air pipe will shift the double check valves 7 and 4 thereon to permit such fluid to become effective in chamber 34 of the respective transmitting device 8 to operate same to supply fluid to the connected pipe 1a and to pipe 1b on the next vehicle, whereby the brake equipments on the vehicles of the train will operate serially to effect a serial application of brakes on said vehicles in the same manner as when controlled by the brake valve device 11. As will be apparent, the brakes on the train may be graduated or in steps and released as desired, in the same manner as when controlled from the brake valve device 11.

When the brakes on the train are controlled from the end opposite the brake valve device 11, operation of the transmitting device 8 on the vehicle carrying said brake valve device is not essential since it will merely supply fluid to pipe 1a connected to said brake valve device, the brakes on said vehicle being applied by fluid under pressure supply by the transmitting device on the connected vehicle. With the brake valve handle 57 in its normal position for releasing fluid under pressure from the connected pipe 1a, the fluid under pressure supplied to said pipe by operation of the transmitting device on the respective vehicle would be vented to atmosphere which is undesirable since it would act to dissipate the supply of fluid under pressure from reservoir 9 for applying the brakes on the vehicle, but this may be avoided by the provision of a cut-out cock 58 in pipe 1a at the brake valve device which will be open when controlling the brakes on the train by said brake valve device and closed when controlling the train brakes from the opposite end of the train.

*Summary*

It will now be seen that I have provided a purely straight air brake equipment particularly adapted for use on vehicles operative in trains for transmitting a pressure change serially from one vehicle to another through a train at such a rate as to provide desired control of braking of said train. Each vehicle is provided with a source of fluid under pressure and a valve device responsive to a pressure change in the straight air pipe section extending toward the leading end of the vehicle to provide from said source a like change in pressure in the straight air pipe section extending toward the opposite end of the vehicle whereby the speed of serial operation of the equipments is substantially independent of the transmission of any material quantity of fluid under pressure on any one vehicle which would tend to slow up such operation.

Having now described the invention, what I claim as new and desire to secure by Letters Patent, is:

1. A straight air brake equipment for a train of connected vehicles comprising in combination, a straight air pipe adapted to extend through the train, a straight air transmitting device for each vehicle comprising means responsive to variations in pressure in one chamber to effect like variations in pressure in a second chamber, means on each vehicle opening said chambers to portions of said straight air pipe on the vehicle which are spaced apart lengthwise of the vehicle, and an operator's straight air brake valve device connected to one end of said straight air pipe for initiating variations in pressure therein.

2. A straight air brake equipment for a train of connected vehicles comprising in combination, a straight air pipe adapted to extend through the train, a source of fluid under pressure for each vehicle, means adapted to be carried on each vehicle responsive to an increase in pressure in one chamber to open said source of fluid under pressure to another chamber and responsive to equalization of pressures in said one chamber to close said second chamber from said source and responsive to a reduction in pressure in said one chamber to open said other chamber to atmosphere, means adapted to be carried on each vehicle for opening said one chamber to said straight air pipe adjacent the leading end of the vehicle and for opening said other chamber to said straight air pipe adjacent the trailing end of the vehicle, and an operator's straight air brake valve device connected to one end of said straight air pipe for initiating variations in pressure therein.

3. A straight air brake equipment for a train of connected vehicles comprising in combination, a straight air pipe adapted to extend through the train, and comprising for each vehicle a first portion adapted to extend to one end of the vehicle and a second portion adapted to extend to the opposite end of the vehicle, a straight air transmitting device for each vehicle responsive to variations in pressure in one of said portions to effect like variations in pressure in the other portion, and an operator's straight air brake valve device adapted to be carried by the vehicle at one end of the train for effecting variations in pressure in the said one portion of the straight air pipe thereon.

4. A straight air brake equipment for a train of connected vehicles comprising in combination, a straight air pipe adapted to extend through the train, and comprising for each vehicle a first portion adapted to extend to one end of the vehicle and a second portion adapted to extend to the opposite end of the vehicle, a pressure transmitting device for each vehicle responsive to variations in pressure in one chamber to effect like variations in pressure in another chamber, and valve means for each vehicle responsive to variations in pressure of fluid initiated in either one of said portions to open said one chamber to the last named portion and said other chamber to the other said portion on the vehicle.

5. A straight air brake equipment for a vehicle of a train comprising in combination, a straight air brake control pipe adapted to extend the length of said vehicle, a pressure transmitting device responsive to variations in pressure in one chamber to effect like variations in pressure in another chamber, and valve means dividing said pipe into two portions and responsive to supply of fluid under pressure to either one of said portions with the other portion vented to open said one chamber to the last named portion and the other chamber to the other portion.

6. A straight air brake equipment for a vehicle of a train comprising in combination, a straight air brake control pipe adapted to extend the length of said vehicle, a pressure transmitting device responsive to variations in pressure in one chamber to effect like variations in pressure in another chamber, valve means subject opposingly to pressures of fluid in said pipe at opposite ends of the vehicle and operative upon supply of fluid under pressure to said pipe at either end of the vehicle with said pipe at the opposite end at atmospheric pressure to a position to open said one chamber to the end of said pipe supplied with fluid under pressure and the other chamber to the other end of said pipe, and means responsive to atmospheric pressure in said other chamber to render said valve means movable and to a higher pressure in said other chamber to hold said valve means against movement.

7. A straight air brake equipment for a vehicle of a train comprising in combination, a straight air brake control pipe adapted to extend the length of said vehicle, a pressure transmitting device responsive to variations in pressure in one chamber to effect like variations in pressure in another chamber, double check valve means dividing said pipe into two portions one for extending to one end of the vehicle and the other to the opposite end and operative in response to supply of fluid under pressure to either portion, with the other portion vented, to a position for opening said one chamber to the portion thus supplied with fluid under pressure and for closing said one chamber off from the other portion, another double check valve means operative in response to supply of fluid under pressure to either one of said portions, with the other portion vented, to a position for opening said second chamber to the vented portion and for closing it off from the portion supplied with fluid under pressure, and means for locking both of said double check valve means in the said positions upon supply of fluid under pressure to said other chamber and for releasing said double check valve means for movement upon release of fluid under pressure from said other chamber.

8. A straight air brake equipment for a vehicle of a train comprising in combination, two straight air brake pipe sections one adapted to extend to one end of the vehicle and the other to the opposite end for connection with a like section on a connected vehicle, a source of fluid under pressure, valve means arranged to respond to variations in pressure in said one section to effect variations in pressure in the other section, and brake control means responsive to pressure changes in one of said sections to effect braking of the vehicle in proportion.

JOHN R. AINSWORTH.

REFERENCES CITED

The following references are of record in the file of this patent:

UNITED STATES PATENTS

| Number | Name | Date |
|---|---|---|
| 1,765,634 | Stewart | June 29, 1930 |
| 2,068,319 | Fitch | Jan. 19, 1937 |